United States Patent
Chow et al.

(10) Patent No.: US 6,807,171 B1
(45) Date of Patent: Oct. 19, 2004

(54) VIRTUAL PATH AGGREGATION

(75) Inventors: Joey Chow, Nepean (CA); Jason Sterne, Ottawa (CA); Denny Lee, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/342,912

(22) Filed: Jun. 30, 1999

(30) Foreign Application Priority Data

Mar. 30, 1999 (CA) .............................. 2267429

(51) Int. Cl.⁷ .............................. H04L 12/28
(52) U.S. Cl. .................... 370/389; 370/230.1; 370/447; 370/461; 370/462
(58) Field of Search ................................ 370/229, 230, 370/230.1, 235, 237, 389, 395.1, 395.2, 395.3, 395.31, 395.4, 395.41, 395.6, 395.61, 395.64, 395.65, 397, 399, 437, 447, 448, 461, 462, 463, 413

(56) References Cited

U.S. PATENT DOCUMENTS

| | | | |
|---|---|---|---|
| 5,629,928 A | | 5/1997 | Calvignac et al. .......... 370/237 |
| 5,689,499 A | * | 11/1997 | Hullett et al. ............... 370/235 |
| 5,699,369 A | * | 12/1997 | Guha ......................... 371/41 |
| 5,867,663 A | * | 2/1999 | McClure et al. ....... 395/200.64 |
| 6,028,861 A | * | 2/2000 | Soirinsuo et al. ........... 370/395 |
| 6,377,561 B1 | * | 4/2002 | Black et al. ................. 370/330 |

OTHER PUBLICATIONS

Dermirtjis and Petr publication IEEE IC3N dated 1995; entitled "How to Encourage Cheating with Virtual Path Policing in ATM Networks"; pp. 1 through 4.

* cited by examiner

Primary Examiner—Dang Ton
Assistant Examiner—Shick Hom
(74) Attorney, Agent, or Firm—Marks & Clerk (57) ABSTRACT

Apparatus and method for implementing virtual path aggregation (VPA) of underlying virtual connections at a switching node of a connection based communications network. A multi-service traffic shaping module (MTSM) at the switch implements algorithms to aggregate the VC and VP connections onto the aggregate VP by representing an aggregate VP as a plurality of circular linked lists or loops and assigning each VC connection to a link or element in the circular linked lists according to traffic descriptors. Weighting factors are used as between loops to dynamically select the next loop to service. Once this loop is chosen, the next VC to be serviced is identified by examining the circular linked list structure.

16 Claims, 11 Drawing Sheets

NETWORK BLOCK DIAGRAM
PRIOR ART
FIG. 1

VIRTUAL PATH AGGREGATION

FIELD OF THE INVENTION

This invention relates to connection based communications networks and more particularly to apparatus and methods for implementing virtual path aggregation while providing fair share arbitration between underlying virtual channel (VC) and/or virtual path (VP) connections.

BACKGROUND OF THE INVENTION

Asynchronous transfer mode (ATM), as an example of connection based communications technology, is rapidly being recognized as the technology of choice for broadband data communications. ATM is a packet-based scheme in which the packets, known as cells, have a fixed number of bytes divided between the cell header and cell payload. ATM technology can efficiently accommodate different service categories thereby being well suited to deliver multimedia traffic such as video, voice and data.

ATM cell traffic between intermediate switching nodes in an ATM network is carried on what are known as virtual connections (VCs). Traffic from end user to end user through a plurality of intermediate nodes is carried on virtual channel connections (VCCs). Since traffic from several sources may have a common destination it is known to combine virtual channel connections onto a virtual path connection (VPC) in order to simplify the processing of traffic through the network. A VCC on a particular link is uniquely identified by the combination of virtual path identifier (VPI) and virtual channel identifier (VCI) fields in the ATM cell headers. A VPC on a particular link is uniquely identified by the VPI field in the ATM cell header. When virtual channel connections are aggregated onto a virtual path connection, the individual virtual channel connections are essentially transparent to the intermediate ATM nodes and this allows a simpler networking model and higher manageability.

A virtual path connection (VPC) is defined as a logical grouping of multiple virtual channel connections (VCCs) into one virtual connection. An implicit logical aggregation of VCCs into a VPC is said to have occurred when the outgoing VCCs all acquire the same common VPI value. Typically, such aggregation occurs at the egress port of an ATM switch where multiple VCCs from multiple ingress ports converge. These aggregating VCCs might have different VPI and VCI values as determined at call setup or network planning time. The egress port of the ATM switch is typically equipped with a cell header translation function. Such a function is capable of translating the incoming VPI and VCI values into a new set of VPI and VCI values. It is this function that accomplishes the aforementioned implicit logical aggregation. When the various VPI and VCI values on the various aggregating VCCs all translate into a common VPI value, a virtual path connection is formed. Note that the VCI value is carried transparently end-to-end within a VPC. It is, therefore, important for the translation function to translate the incoming VCI values into a mutually exclusive set of VCI values. Such mutual exclusivity allows each underlying VCC to be uniquely identified at the terminating end of the VPC. At that point, the VPC is segmented by simply switching and processing each underlying VCC as an individual connection. The combination of an egress aggregation function together with the ingress segregation function on a bi-directional port is referred to as the virtual path termination point (VPTP).

Although the aggregation of virtual channel connections onto a common path simplifies traffic management, concerns have been expressed that individual virtual channel connections may not all be treated fairly when aggregated onto a virtual path connection. Demirtjis and Petr (IEEE IC3N, 1995 "How to Encourage Cheating with Virtual Path Policing in ATM Networks") have found that virtual channel connections which are in compliance with predefined transmission parameters may be adversely affected by non-compliant traffic when aggregated onto a virtual path.

U.S. Pat. No. 5,629,928 which issued May 13, 1997 to Calvignac et al discloses one technique for controlling traffic flow in a virtual path communication system wherein queues allocated as needed from a pool of free queues are used to store all incoming data cells having the same virtual channel identifier.

U.S. patent application Ser. No. 09/200,444 filed Nov. 27, 1998 by Carr et al and assigned to Alcatek Canada Inc. now U.S. Pat. No. 6,643,295 discloses an apparatus and method for scheduling and shaping multi-service category cell traffic unto virtual path connections. The contents of U.S. Pat. No. 6,643,295 are incorporated herein by reference.

The present invention seeks to provide solutions to the problem of how to group the underlying VCs and/or VPs to form an aggregate-VP, and how to fairly select an underlying VC/VP to service.

SUMMARY OF THE INVENTION

The present invention provides a technique of representing and managing the Aggregated-VPs and underlying VCs. The invention also provides a technique of fairly selecting and keeping track of the next underlying VC that should be serviced.

Therefore, in accordance with a first broad aspect of the present invention there is provided in a digital communications network a method of aggregating multiple virtual circuits (VCs) to form an aggregate-virtual path comprising: creating a linked list to represent the aggregate virtual path and assigning each of the VCs to an element in the linked list.

In a preferred embodiment the linked list is a circular linked list. Further, the aggregate virtual path will consist of a group of such circular linked lists with individual linked lists allocated in accordance with traffic descriptors.

In accordance with a further broad aspect of the invention there is provided a device for aggregating virtual circuits in a digital communications network into aggregate virtual paths, the device comprising: means to create a linked list associated with each aggregate virtual path, and means to assign each virtual circuit to an element in the linked list.

In a preferred embodiment of this aspect of the invention a group of circular linked lists will be created. Further, the device will include means to add or remove each virtual circuit to or from one of the circular linked lists.

The invention advantageously provides arbitration of the individual VCs at their aggregation into a VP (VPA) whereby conformance of that VP connection to its traffic descriptor is ensured within the network core.

BRIEF DESCRIPTION OF THE DRAWINGS

The invention will now be described in greater detail with reference to the attached drawings wherein.

DETAILED DESCRIPTION OF THE INVENTION

Figure 1:
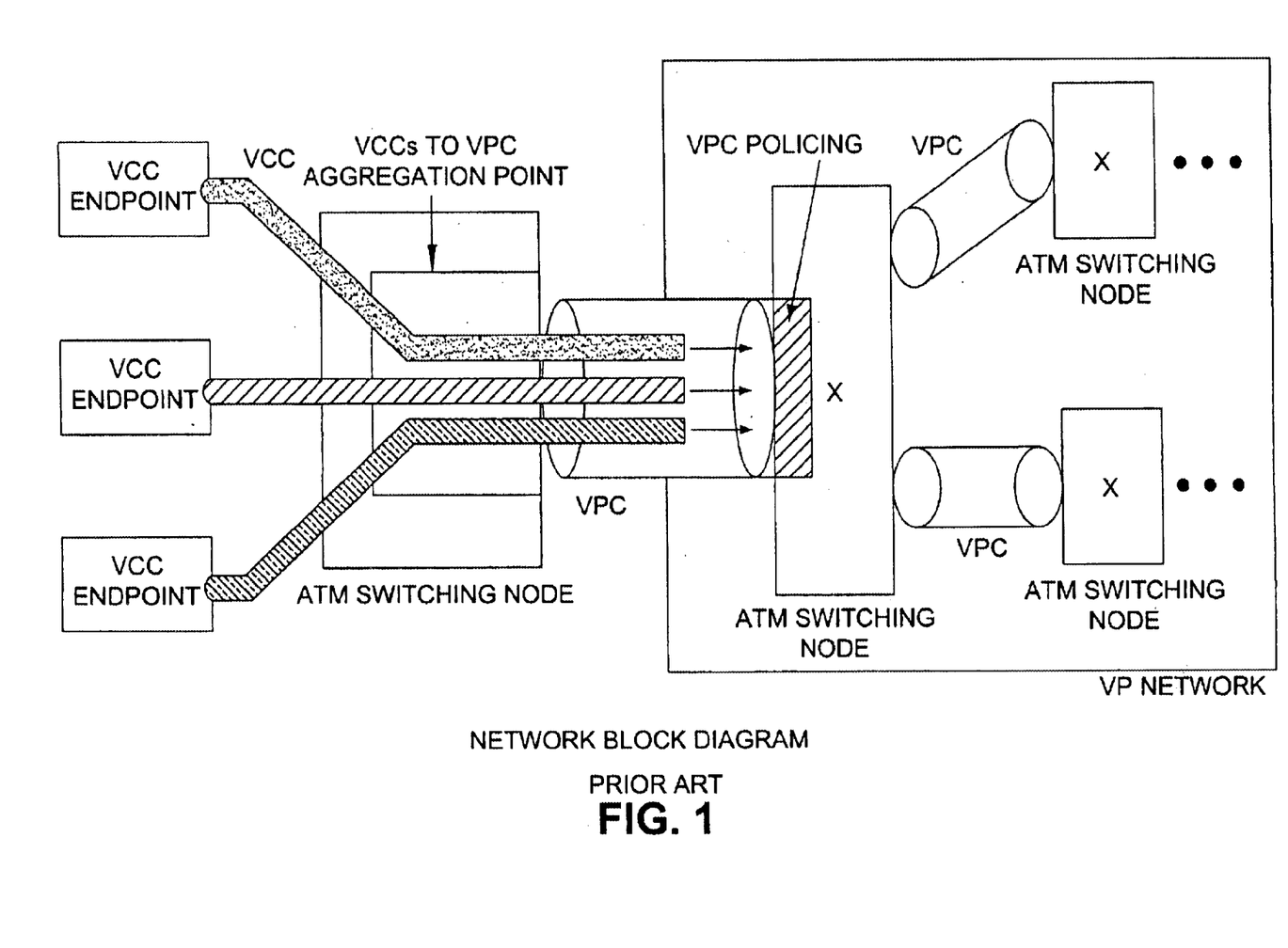
FIG. 1 is a block diagram of an ATM network with VP aggregation.

FIG. 1 is a network block diagram showing VCCs connected to a switching node. In FIG. 1 three VCCs are shown while it is to be understood that in practice numerous VCCs may converge on a node. The VCCs are aggregated onto a VPC and transported to a downstream node for separation and transmission to designated end points. As discussed in the previously identified U.S. application Ser. No. 09/200,444 the ATM Forum has defined a number of service categories in order to distinguish between types of cell traffic carried by an ATM network. These service categories include real-time traffic such as variable bit rate (rt-VBR) and constant bit rate (CBR) as well as non-real time traffic: variable bit rate (nrt-VBR); available bit rate (ABR) and unspecified bit rate (UBR). Parameters relating to service delivery can vary for each service category and hence there is a need to be able to fairly schedule connections of each type when aggregated onto a VPC or, as referred to herein, an aggregate-VP (AVP).

Figure 2:
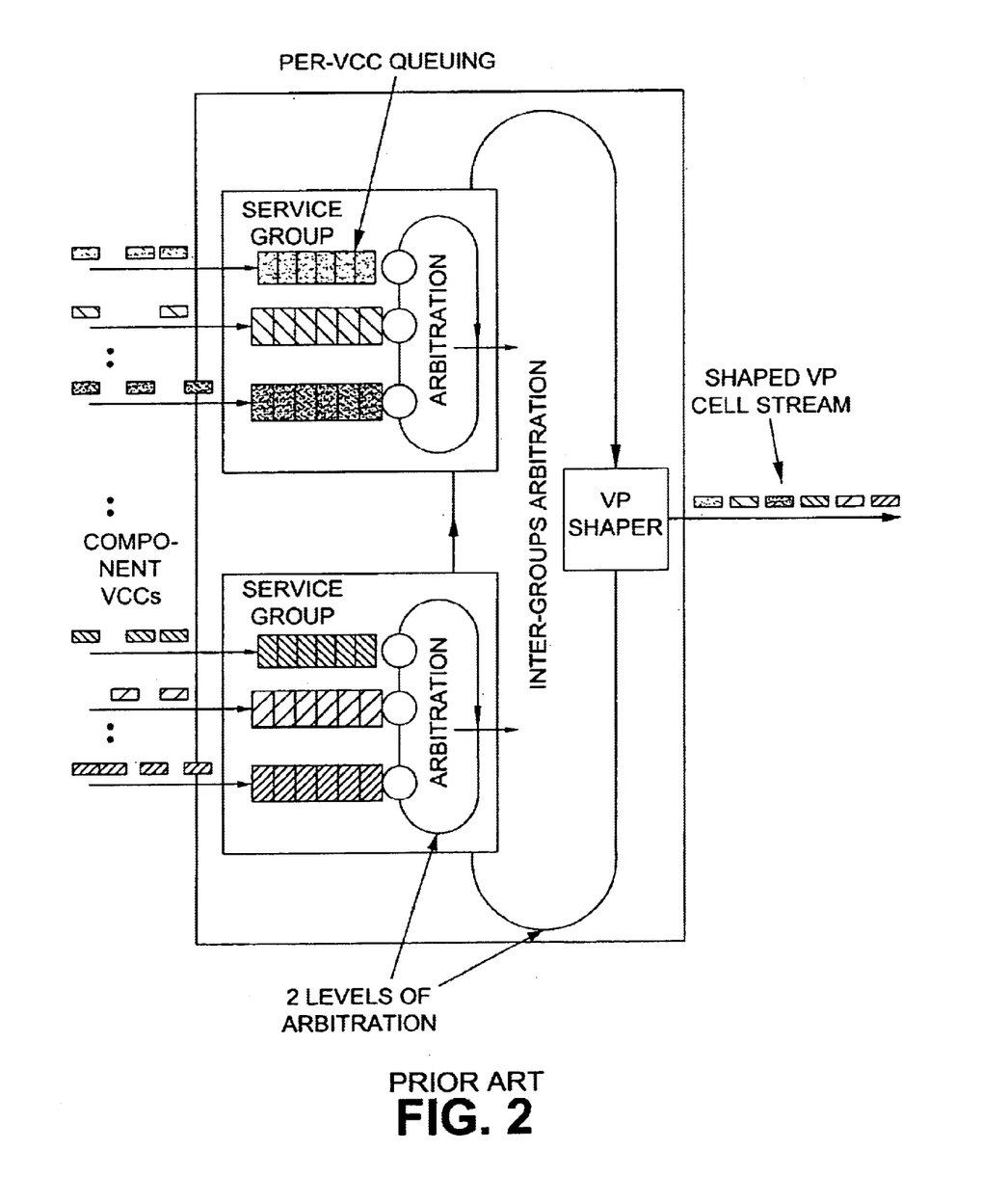
FIG. 2 illustrates one example of a virtual path shaping technique.

FIG. 2 illustrates a scheduling technique utilizing per VC queuing. For greater details respecting this technique reference may be made to the aforementioned U.S. patent application Ser. No. 09/200,444.

Figure 3:
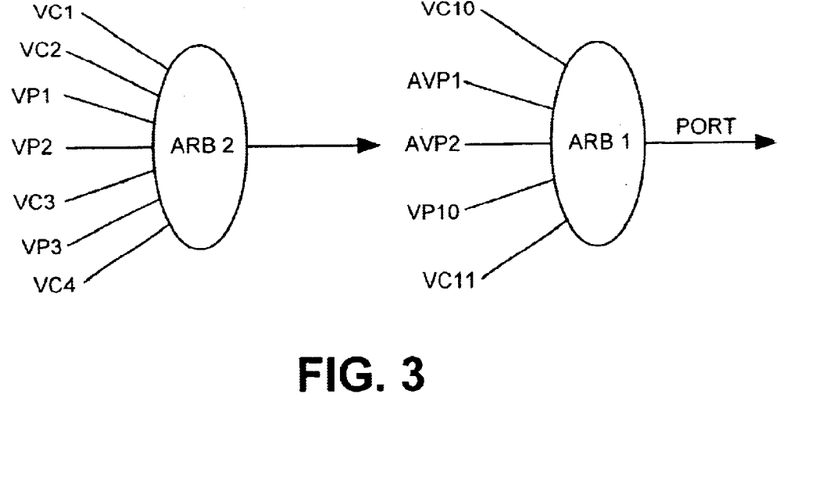
FIG. 3 illustrates an exemplary hierarchical arbitration scheme according to a broad aspect of the invention.

As shown generally in FIG. 3 a hierarchical scheme of arbitrating between connections is contemplated by the invention. At an egress port of a switching node connections are serviced in accordance with arbitration algorithms in order to comply with negotiated network traffic descriptors. In FIG. 3 Arbitrator 1 (Arb 1) selects as between the various aggregated-VPs, VPs and VCs which converge thereat. When an aggregated-VP is selected by Arb 1 for servicing, a second level of arbitration (Arb 2) in connection with the selected AVP determines which of the underlying VCs/VPs will be serviced. Arb 2 in this example effectively implements the AVP, in accordance with the present invention, an embodiment of which is described in more detail in the following.

It is noted that the two levels of arbitration illustrated in FIG. 3 is merely an example of an hierarchical scheme which in practice could consist of multiple (i.e. two or more) levels of arbitration. Furthermore, if only a single aggregate VP is to be transported through a particular port, then only a single arbiter (e.g. Arb 2) is needed.

Figure 4:
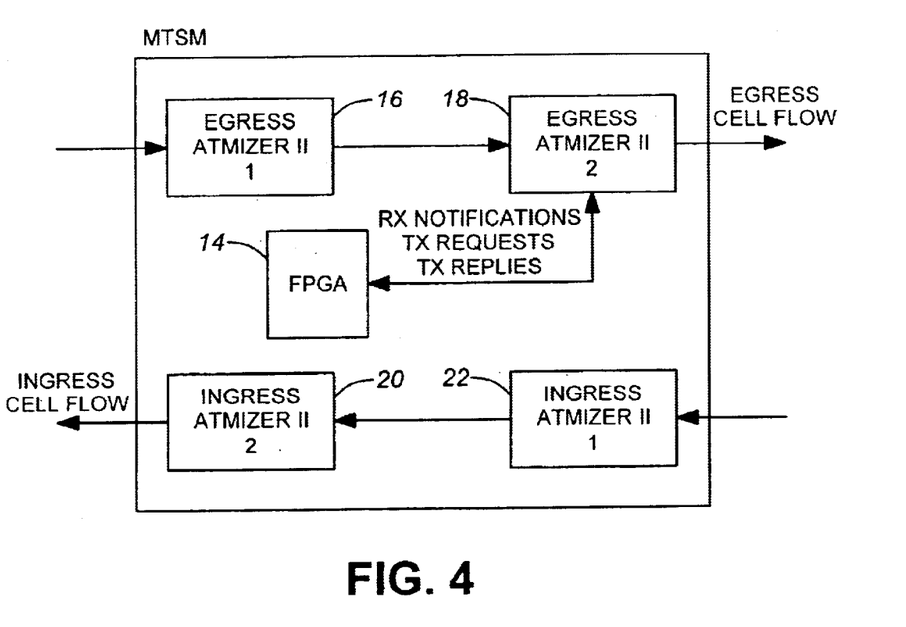
FIG. 4 is a block diagram of a multi-service traffic shaping module.

In an ATM network switching may be effected at nodes by a multi-service switch such as a MainStreetXpress 36170 ATM switch supplied by Newbridge Networks Corporation. The traffic shaping and policing function within the 36170 may be provided, for example, by a Multi-service Traffic Shaping Module (MSTM). A simplified block diagram of a MSTM is shown in FIG. 4. The Multi-service Traffic Shaping Module (MTSM) provides a number of advanced traffic management and traffic shaping features for a Newbridge 36170 ATM cell relay card. One of these advanced features is VP Aggregation (VPA). VPA is the logical grouping of a number of VPCs and/or VCCs onto one single VPC, called the Aggregate-VP (AVP). The grouped VPCs and VCCs are collectively referred to herein as underlying Virtual Connections (VCs), and as a group, they take on the queuing and shaping characteristics of the AVP. As discussed previously in relation to FIG. 3, multiple AVPs may exist at an arbitration point in a communications network.

The simplified block diagram of an MTSM in FIG. 4 shows a Field Programmable Gate Array (FPGA) 14 and four ATM cell processors 16, 18, 20, 22, such as ATMizerIIs available from LSI Logic Corporation. FIG. 4 also illustrates one possible location of the ATMizers in the egress (16, 18) and ingress (20, 22) cell data paths. Four ATMizers are shown in the block diagram of FIG. 4 while in some implementations two such units (one egress and one ingress) may suffice.

Egress ATMizerII 18 is responsible for shaping the Aggregate-VPs. It uses a calendar based scheme to determine when in time a particular Aggregate-VP should be serviced. Once the particular Aggregate-VP is chosen, the FPGA is required to select an underlying VC within that AVP to service. Egress ATMizerII 18 communicates with the FPGA 14 by issuing receive (Rx) and transmit (Tx) Notifications. Rx Notifications are issued when ATMizerII 18 receives a cell for processing. Tx Notifications are issued when ATMizerII 18 transmits a cell. ATMizerII 18 also includes buffers for physically queuing cells awaiting processing. The FPGA maintains queue counters in order to keep a dynamic count of the number of cells queued in ATMizerII 18.

A couple of problems may arise in attempts to implement VPA, such as, how can the underlying VCs be grouped to form an Aggregate-VP, and how to fairly select the next underlying VC to service.

The present invention addresses these problems by presenting a solution to the representation and management of one or more Aggregate-VPs and the underlying VCs. As well, a solution is presented for fairly selecting and keeping track of the next underlying VC that should be serviced.

The problem of implementing an Aggregate-VP is addressed by first representing all the underlying VCs as an element or item in a linked list. Each Aggregate-VP, typically, will have a number of linked lists, such as circular linked lists or 'loops' associated with it, and an underlying VC will belong to one of these loops based on its assigned traffic descriptor at the time. Each Aggregate-VP has a pointer to one element or item in each of the currently active loops, this pointer being referred to as the 'tail pointer'. The number of circular linked lists or loops in an Aggregate-VP structure can range from one to some large number, although in practice the number will typically be from two to not more than 10. A linked list can be defined as a chain of items in which each item points to the next on the chain and each item represents a link in the linked list. The term circular linked list, as used herein, means that the last item on the chain points back to the first item.

Once an AVP is chosen the problem of fairly selecting the next underlying VC to service within that AVP is solved by two key algorithms. First, an arbitration algorithm decides which loop to 'service'. The decision involves the active loops at the time and is based on a combination of exhaustive and weighted round robin arbitration. The approach, which uses re-loadable weight counters as loops become active and inactive, allows for fair arbitration amongst the loops while maximizing bandwidth. Once the loop is chosen, the underlying VC to be serviced is identified by examining the next element or link in the circular linked list structure. The next element or link is chosen by following the 'tail pointer' which points to the head of the linked list. The selection of the next element is implemented by a second algorithm.

The circular linked list (loop) structures are constantly maintained and updated, allowing for considerable flexibility in adding and removing connections as well as changing connections from one loop to another.

In implementation, the Aggregate-VP is represented by a number of circular linked lists or loops. The loops represent the aforementioned service categories available within the Aggregate-VP. In this particular implementation, the number of loops is four that represent, for example, CBR, VBR, ABR and UBR. It is to be understood, as discussed previously, that the actual number may vary depending on the system service category requirements. Also associated with each loop is a number of variables, which include: 'connActive'; an indicator revealing which loops have active connections in them, and a series of static and dynamic weight (Ws and Wd, respectively) counters used to convey priority between the loops to allow the fair selection of the next loop to service.

Each AVP has a set of pointers that point to the circular linked lists that represent the underlying VCs that are associated with it. The particular element or link that the pointer points to is the last underlying VC serviced in that loop. This VC is referred to herein as the tail of the loop. The tail pointers in the Aggregate-VP are continually updated to point to the tail of the loops. The tail itself always points to the last underlying VC in the loop to be serviced.

Figure 5:
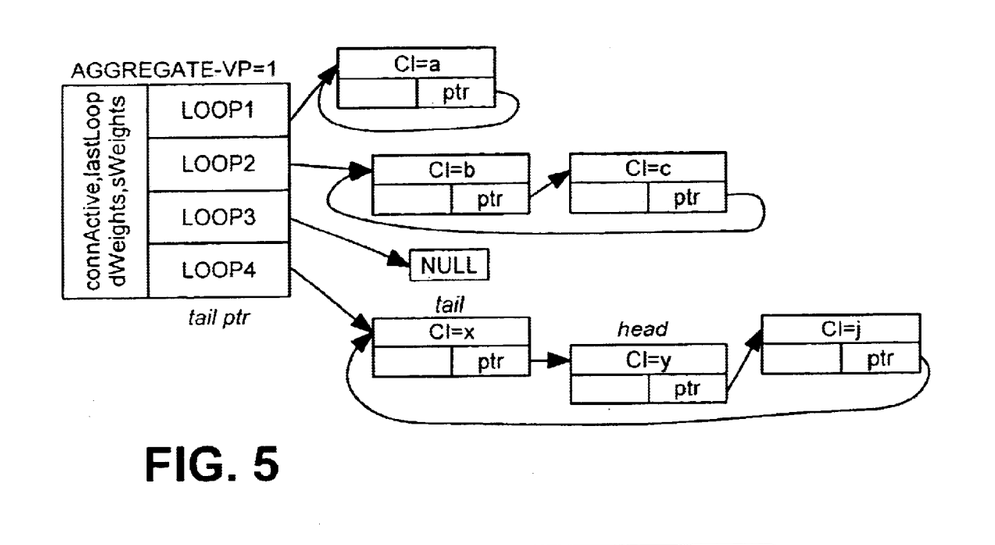
FIG. 5 is an example of an aggregate-VP utilizing a group of circular linked lists according to the present invention.

An Aggregate-VP is conceptually represented in FIG. 5. This Figure shows one aggregate VP, namely Aggregate-VP=1. It is shown to have three active loops, namely: Loop1, Loop2, and Loop4. Loop1 has one connection in the loop, Loop2 has 2 connections, and Loop4 has three connections. Loop3 does not have any active connections and hence points to a NULL connection. The loops are actually pointers to the 'tail' of the underlying VC linked list. As shown in relation to Loop4 the tail pointer points to the tail or last connection on the loop to be serviced. The head pointer points to the first or next connection on the loop to be serviced.

As discussed previously cells are physically queued on the ATMizerII on a per-connection basis. The FPGA maintains local counters for each queue such that the FPGA knows how many cells are in each connection queue. This is done through Rx Notification and Tx Requests/Replies.

Associated with each underlying VC is information indicating or identifying the Aggregate-VP (aggId) and the current loop (currLoop) that the underlying VC belongs to, the next loop (nextLoop) in which the underlying VC should be placed, and a pointer to the next underlying VC in the circular linked list. The next loop information is programmed by the system level software to indicate to which aggregate-VP the connection should belong. The current loop information is updated by the algorithms as will be discussed later. If the connection's aggId is 'NULL', the connection is not meant to be part of an aggregate-VP. If connection's currLoop is NULL, then the connection is currently not in any loop. If the connection's nextLoop is NULL, then the connection should be removed from the loop that it is currently in. By monitoring and comparing the values: aggId, currLoop, and nextLoop, a decision can be made as to what to do with a connection, i.e. should it be removed from a loop, added to another loop, etc.

Figure 6A:
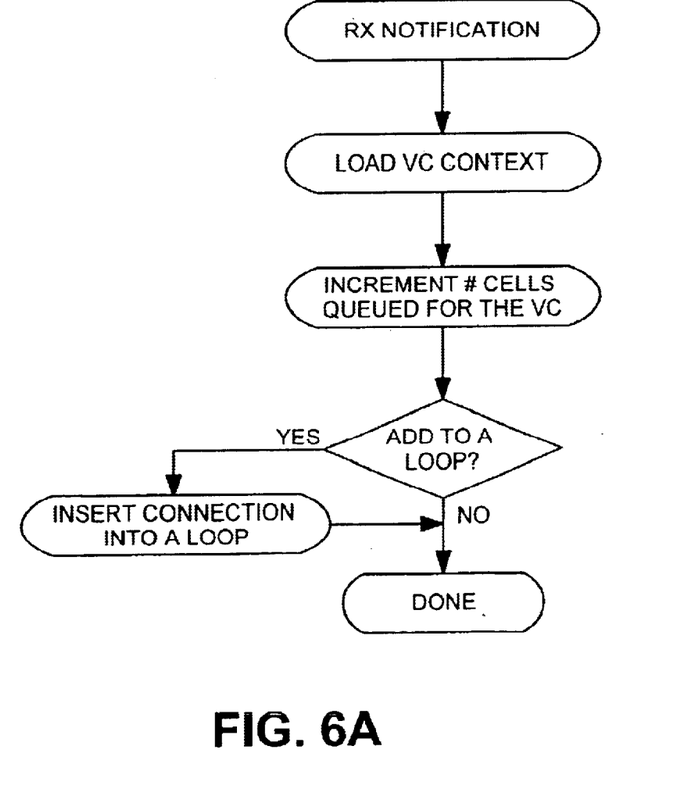
FIGS. 6A and 6B are flow diagrams illustrating algorithms for processing receive and transmit notifications respectively.

In general, the algorithms operate as follows: when a cell is received at egress AYMizerII 18, an Rx Notification is issued. The Rx Notification includes a connection/queue identifier. The FPGA 14 loads the connection context associated with the received cell, increments the number of cells queued for that connection, and decides whether to add the connection to a loop. It then adds the connection to a loop if required. When egress ATMizerII 18 is ready to transmit a cell on a specific VPA (i.e. Arb 1 of FIG. 3 has been performed by ATMizerII 18), it issues a Tx Request. The Tx request includes a VPA identifier. FPGA 14 loads the context for the VPA and chooses a loop and underlying connection/VC to service for that VPA. A Tx Reply is then issued. The Tx Reply includes a connection identifier that is the underlying connection/VC to be serviced for the VPA specified in the original Tx request. ATMizerII 18 will use the connection/VC identifier returned in the Tx Reply to send a cell on the specified connection/VC. FPGA 14 then decides whether or not to move the connection to another loop. The loop information is also updated to point to the most current tail. The above description is best shown in the simplified algorithm set out in FIGS. 6A and 6B.

One possible variation to the algorithm presented above can be employed to reduce the latency between the Tx Request submitted by ATMizerII 18 and the Tx Reply sent by FPGA 14. FPGA 14 could choose a loop and underlying connection/VC as the next connection/VC to send for each VPA ahead of time. This information could be presented in a table that ATMizerII 18 could simply read for any particular VPA, instead of issuing a Tx Request and waiting for FPGA 14 to calculate a new underlying connection/VC and send a Tx Reply. The action of reading the table could trigger FPGA 14 to choose a new loop and underlying connection/VC to service. FPGA 14 could then place the new underlying connection/VC into the table. In this manner, ATMizerII 18 would never be waiting while FPGA 14 is choosing a loop and connection.

Figure 7:
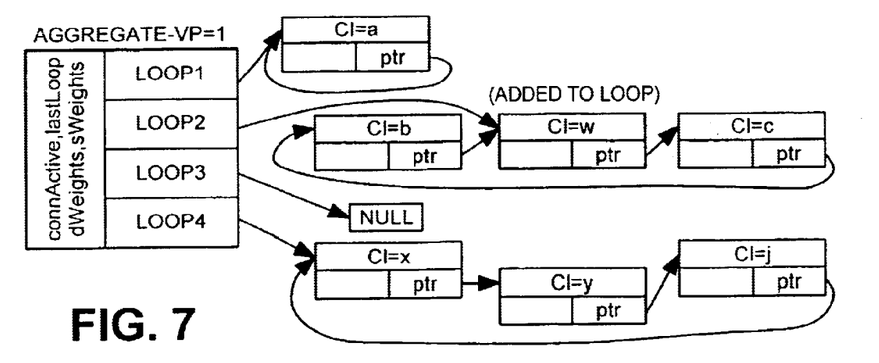
FIG. 7 illustrates a circular linked list or loop (Loop2) with a connection (CI=W) that was just inserted.

The decision to add a connection to a loop is based on aggId≠NULL, currLoop==NULL, and nextLoop≠NULL. This indicates the case where a connection is not in a loop, but should be. The 'INSERT CONNECTION INTO A LOOP' bubbles in FIG. 6A add an underlying VC into a loop. As mentioned earlier, the loop points to the tail of the circular linked list. When a connection is to be added to a loop, it is inserted after the tail. To perform the insertion, the tail's pointer is changed to point to the new connection and the new connection's pointer is set to point to what the tail originally pointed to. The loop tail pointer is then moved to point to the new connection. This ensures that the new connection is the last due to be serviced. As an example, consider FIG. 5, and suppose a new connection, CI=W, is to be added to Loop2. The Aggregate-VP would then look like the loop depiction in FIG. 7.

When an underlying VC's currLoop≠nextLoop, or when the nextLoop==NULL, then the connection should be removed from a loop. A connection will also be removed from a loop when its number of cells queued reaches zero.

Figure 6B:
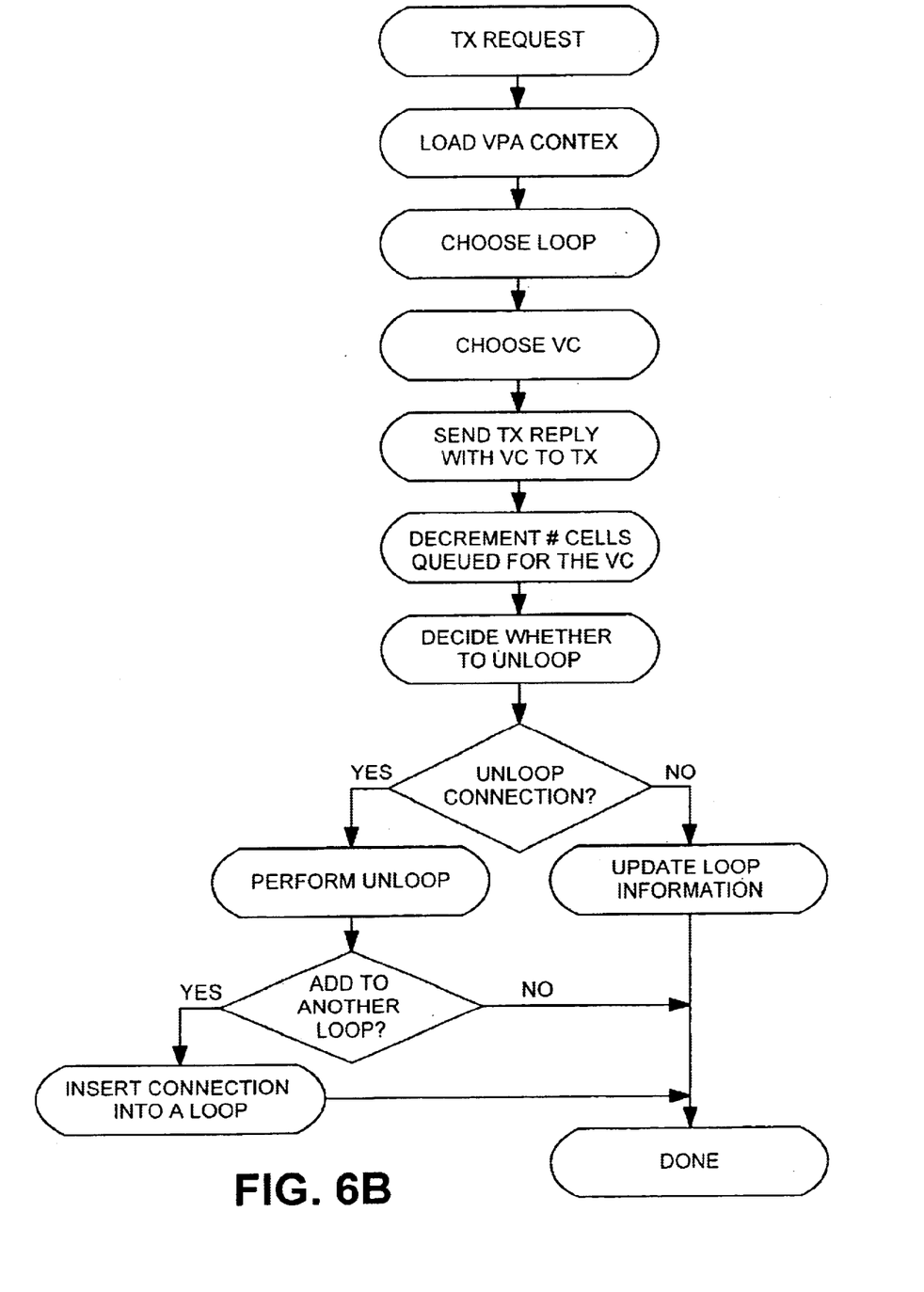
Figure 8:
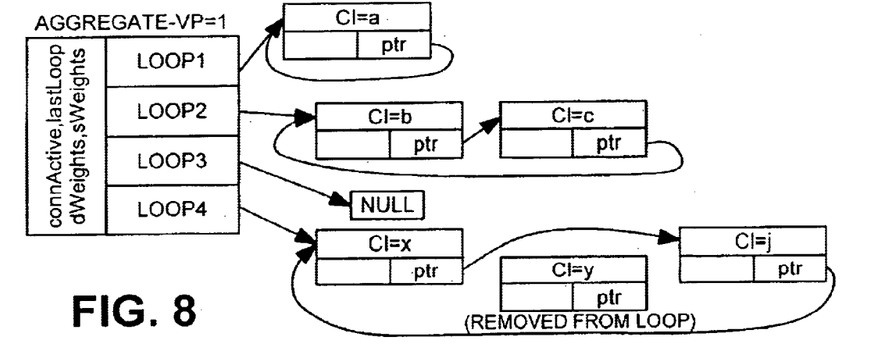
FIG. 8 illustrates a loop (Loop4) having a connection (CI=Y) that was just removed.

The 'PERFORM UNLOOP' bubble in FIG. 6B removes an underlying VC from a loop. An underlying VC will typically be removed from a loop only after it has been pointed to by the tail pointer. The unloop procedure involves changing what the tail points to, to that of what the removed connection points. Consider again FIG. 5 and suppose now that connection CI=Y must be removed from Loop4, then after the unloop procedure, the Aggregate-VP would look like the circular linked list shown in FIG. 8.

Figure 9:
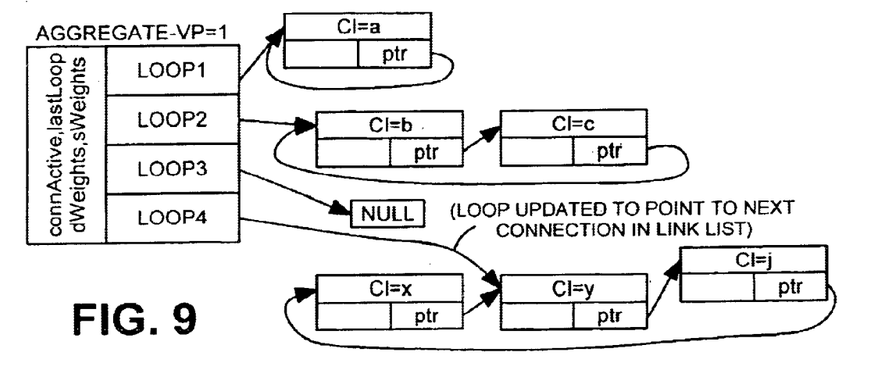
FIG. 9 illustrates a loop (Loop4) after the loop pointer (the tail pointer) has been advanced.

When an underlying VC's currLoop==nextLoop, nothing needs to be done to the underlying VC and the loop information is updated. The 'UPDATE LOOP INFORMATION' bubbles in FIG. 6B simply advances the loop's tail pointer to the next connection in the circular linked list of underlying VCs. The loop's tail pointer is changed to what the tail points to. If we consider FIG. 5 again, and suppose an update is performed on Loop4, then the state of the Aggregate-VP would look like that which is shown in FIG. 9.

The 'CHOOSE LOOP' bubble in the Tx Notification flow of FIG. 6B is an arbitration algorithm that decides which loop should be serviced. A pseudo-code description of how it operates follows:

--- cbrPresent; nrtPresent; abrPresent; ubrPresent = '1' when at least one cell exists in its respective Aggregate-VP loop.
nrtWeightCtr; abrWeightCtr; ubrWeightCtr are the current weight counters for each loop.
nrtStaticWeightCtr; abrStaticWeightCtr; ubrStaticWeightCtr; are the static, or initial, weights assigned to each loop.
currentActive <= cbrPresent & nrtPresent & abrPresent & ubrPresent;
nrtZero <= '1' when (nrtWeightCtr = 0) else '0';
abrZero <= '1' when (abrWeightCtr = 0) else '0';
ubrZero <= '1' when (ubrWeightCtr = 0) else '0';
if ( {all active weight counters = 0} ) then
    nrtWeightCtr <= nrtStaticWeightCtr;
    abrWeightCtr <= abrStaticWeightCtr;
    ubrWeightCtr <= ubrStaticWeightCtr;
end if;
if (cbrPresent = '1') then
    choose CBR loop
    read nextCI and inform second egress ATMizerII
elsif ( (nrtPresent = '1') and (nrtWeightCtr ≠ 0)) then
    choose NRT loop
    read nextCI and inform second egress ATMizerII
    decrement nrtWeightCtr
elsif ( (abrPresent = '1') and (abrWeightCtr ≠ 0)) then
    choose ABR loop
    read nextCI and inform second egress ATMizerII
    decrement abrWeightCtr
elsif ( (ubrPresent = '1') and (ubrWeightCtr ≠ 0)) then
    choose UBR loop
    read nextCI and inform second egress ATMizerII
    decrement ubrWeightCtr
else
    {no more cells queued for this VP}
    write NULL CI to second egress ATMizerII
end if
{all active weight counters = 0} is computed as follows:
((nrtZero or not(nrtPresent)) and (abrZero or not(abrPresent)) and (ubrZero or not(ubrPresent))

---

A detailed description and example of the VPA algorithms along with the actual aggregate and underlying VC context descriptions follows.

The VPA algorithms on the MTSM are concerned with arbitrating amongst underlying VC streams. When the calendar scheduling system determines that it is time to send a cell on a VPA, then the VPA algorithms must determine from which connection a cell is to be sent.

As a simple example, consider a CBR VPA with three VC connections, each of which have a few cells queued up for transmission: one CBR, one nrtVBR, and one UBR. The VPA algorithms will select the CBR connection as the connection from which to send a cell.

In the implementation described here the arbitration algorithm considers every underlying VC connection in a VPA as belonging to one of four groups or loops. A connection is identified as belonging to a loop based on its service category. Typically many connections will be in any given loop as shown in Table 1 below.

| Service Category | LoopId | Loop Name |
|---|---|---|
| CBR, rtVBR | 0 | RT |
| nrtVBR | 1 | NRT |
| ABR | 2 | ABR |
| UBR | 3 | UBR |

Underlying VC connections in a VPA are serviced according to the following rules:
1) The real time (rt) loop is exhaustively serviced over the other 3 loops;
2) Connections within the rt loop are serviced in a round robin fashion;
3) The nrt, abr, and ubr loops are serviced in a Weighted Round Robin fashion;
4) Connections within any loop are serviced in a round robin fashion.

In order to perform the VPA arbitration, there is some logic and some context required. The context includes some per-connection (i.e. per-underlying VCC) context as well as some per-VPA (i.e. per shaped/arbitrated VP) context.

The per-connection context includes the following items/fields:
vc[z].aggId (7 bits )=An identifier to indicate to which Aggregate-VP this underlying VCC belongs.
vc[z].nextLoop (3 bits )=Indicates the loop that the connection should be placed onto.
vc[z].currLoop (3 bits )=Indicates the loop that the connection is currently on (may not equal nextLoop!).
vc[z].nextCI (13 bits)=Points to the next connection on a loop.
vc[z].#CellsQd (16 bits)=A count of the cells queued on a particular underlying VC connection.
The per-VPA context includes the following items/fields:
agg[y].rtTail=A connection identifier that points to the "Tail" of the real time loop of connections.
agg[y].nrtTail, agg[y].abrTail, agg[y].ubrTail=Same idea as rtTail.
agg[y].currAct=A four bit bitfield where each bit represent the state of one of the loops. The bit for a loop will be set if there is at least one connection in the loop with queued cells.
agg[y].nrtWs, agg[y].abrWs, agg[y].ubrWs=The static weights for the nrt, abr, and ubr loops.
agg[y].nrtWd, agg[y].abrWd, agg[y].ubrWd=The dynamic weight counters for the nrt, abr and ubr loops.
LastLoop=a field that indicates the loop that was chosen by the previous iteration of the arbitration algorithm.

Figure 10:
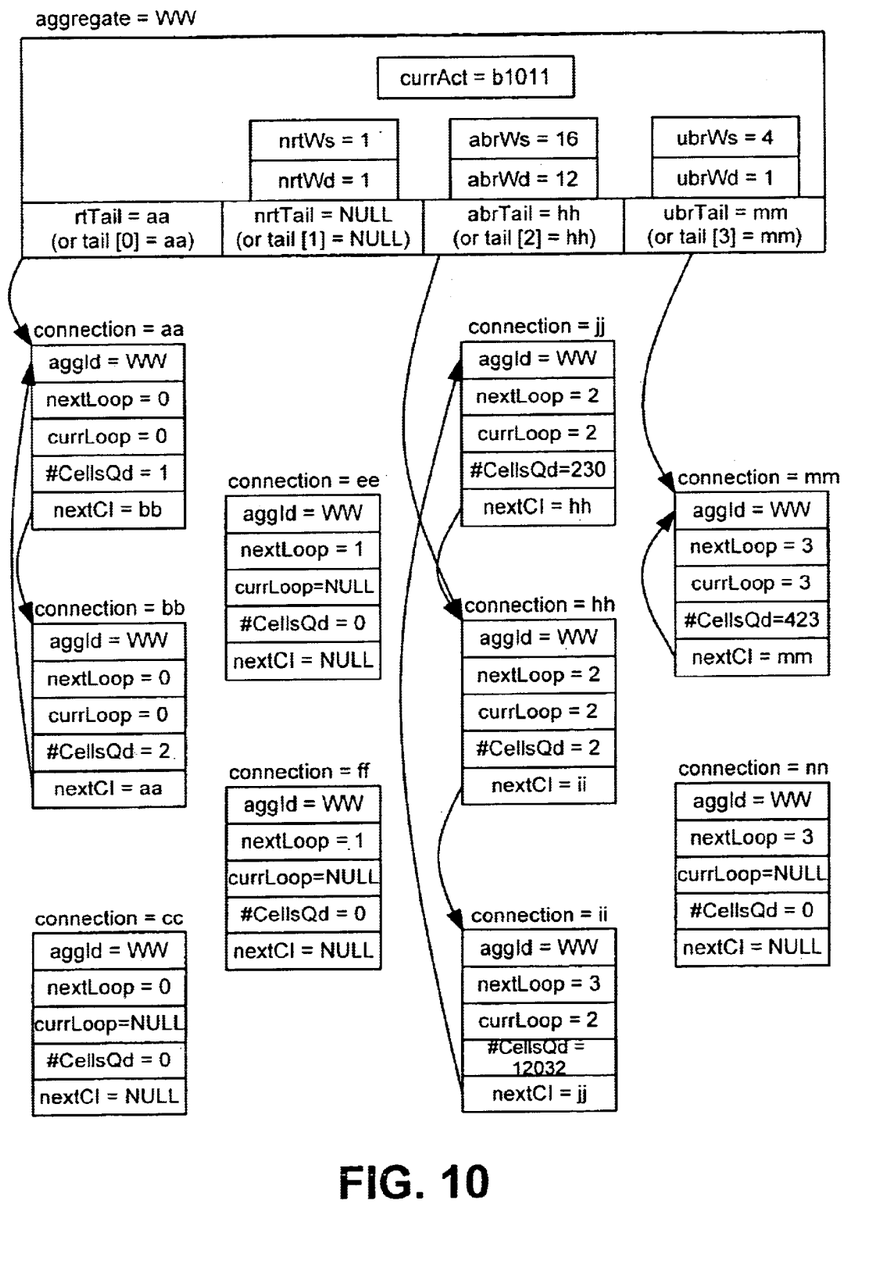
FIG. 10 depicts one example of a VP-aggregation and its underlying connections (VCs or VPs)

FIG. 10 is an example of a possible snapshot of the state of a VPA and its underlying connections. A connection can be in a loop (e.g. connection aa) or out of a loop (e.g. connection cc). A connection will typically be in a loop if it has cells queued.

It is to be noted that a connection can be in a loop, yet the nextLoop could point to a different loop (see connection ii in FIG. 10). This means that the connection was placed on a loop, but then the service category of the connection was changed. This connection will need to change loops at some point in the future. The following logic part of the VPA algorithms show when and how this is done.

There are several algorithms described: 1) What must occur upon receipt (Rx) of a cell in the queuing entity, and 2) What must occur in order to transmit (Tx) a cell on a VPA.

1) Cell Rx.

Figure 11:
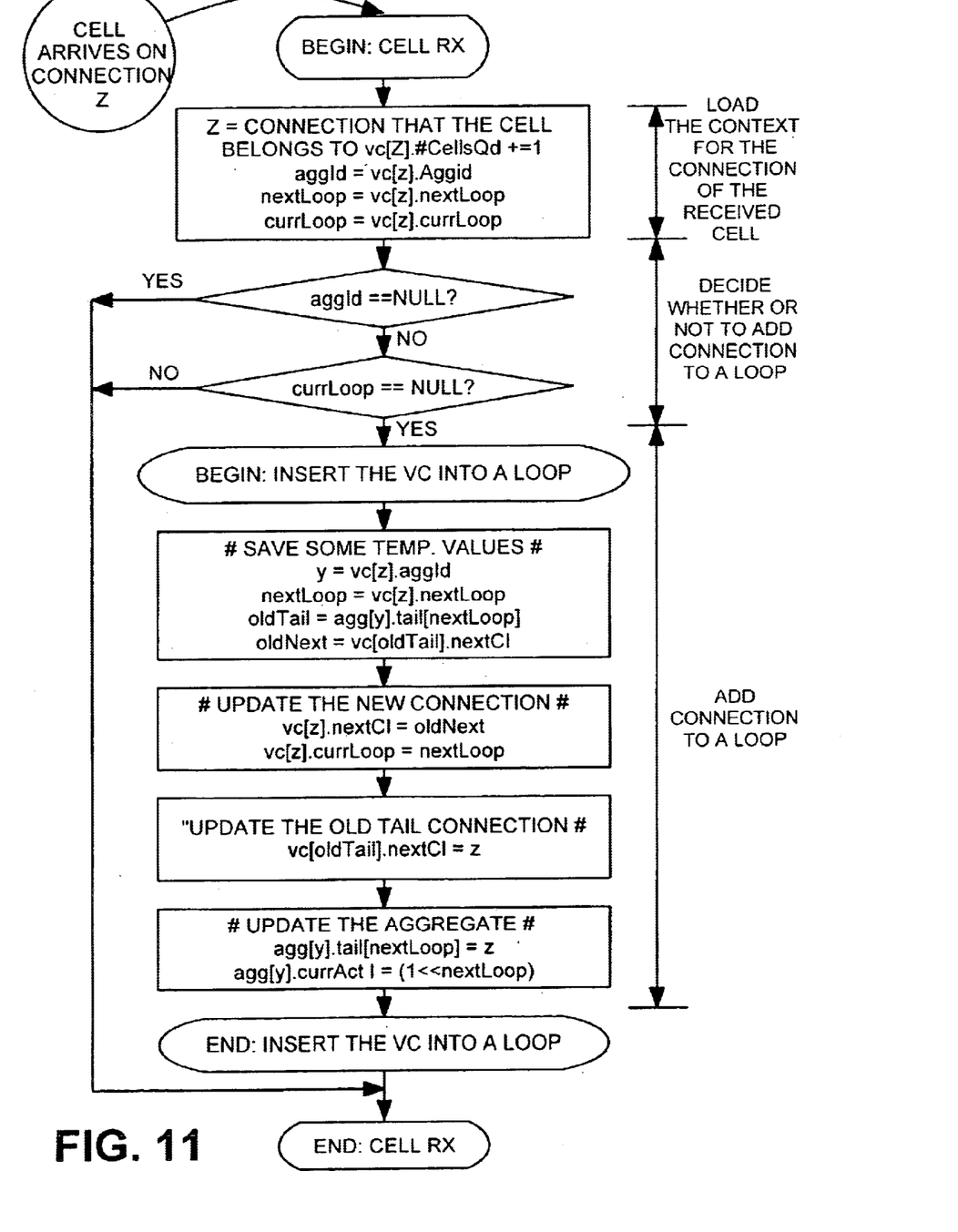
FIG. 11 is an VP-aggregation algorithm implemented upon receipt of a cell on a connection.

When a cell is received at the queuing entity, there are several actions that must take place:

If the connection is not on a loop, add it to the appropriate loop for the VPA to which it belongs;

If the connection is added to a loop, set the currAct bit associated with the loop in the VPA context as shown in FIG. 11.

2) Cell Tx (or Service a VPA).

When the scheduling mechanism of the MTSM determines that it is time to service a particular VPA, then the Tx algorithm will be executed. The Tx algorithm will determine which of the underlying VC connections to service.

If a connection is serviced and its vc[z].#CellsQd drops to zero, then the connection will be removed from its loop.

If a connection is serviced and the algorithm detects that the connection is in the wrong loop (nextLoop≠currLoop), then the connection will be removed from the current loop and added to the correct loop.

The aggregate/VPA context contains static weight and dynamic weight counters for the nrt, abr, and ubr loops. These weights are used to implement a Weighted Round Robin arbitration scheme. The static weights represent the relative servicing weights amongst the three loops. When a cell is serviced from a particular loop, then the dynamic weight counter for that loop is decremented. When all ACTIVE loop counters reach zero, then the three weight counters are re-initialized with the values contained in the static weights.

Figure 12A:
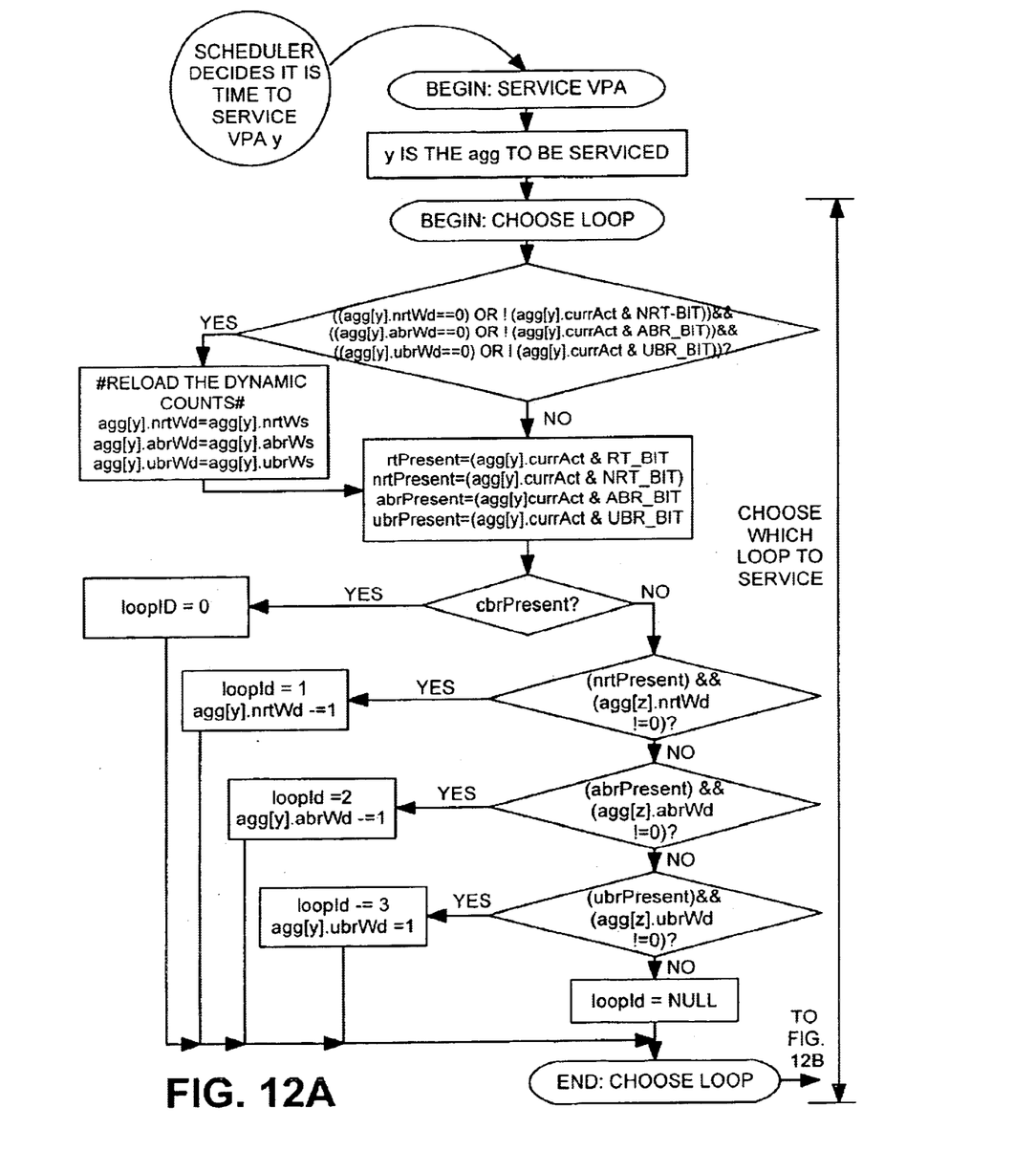
FIGS. 12A to 12C represent an algorithm to process the transmission of a cell on a connection.
Figure 12B:
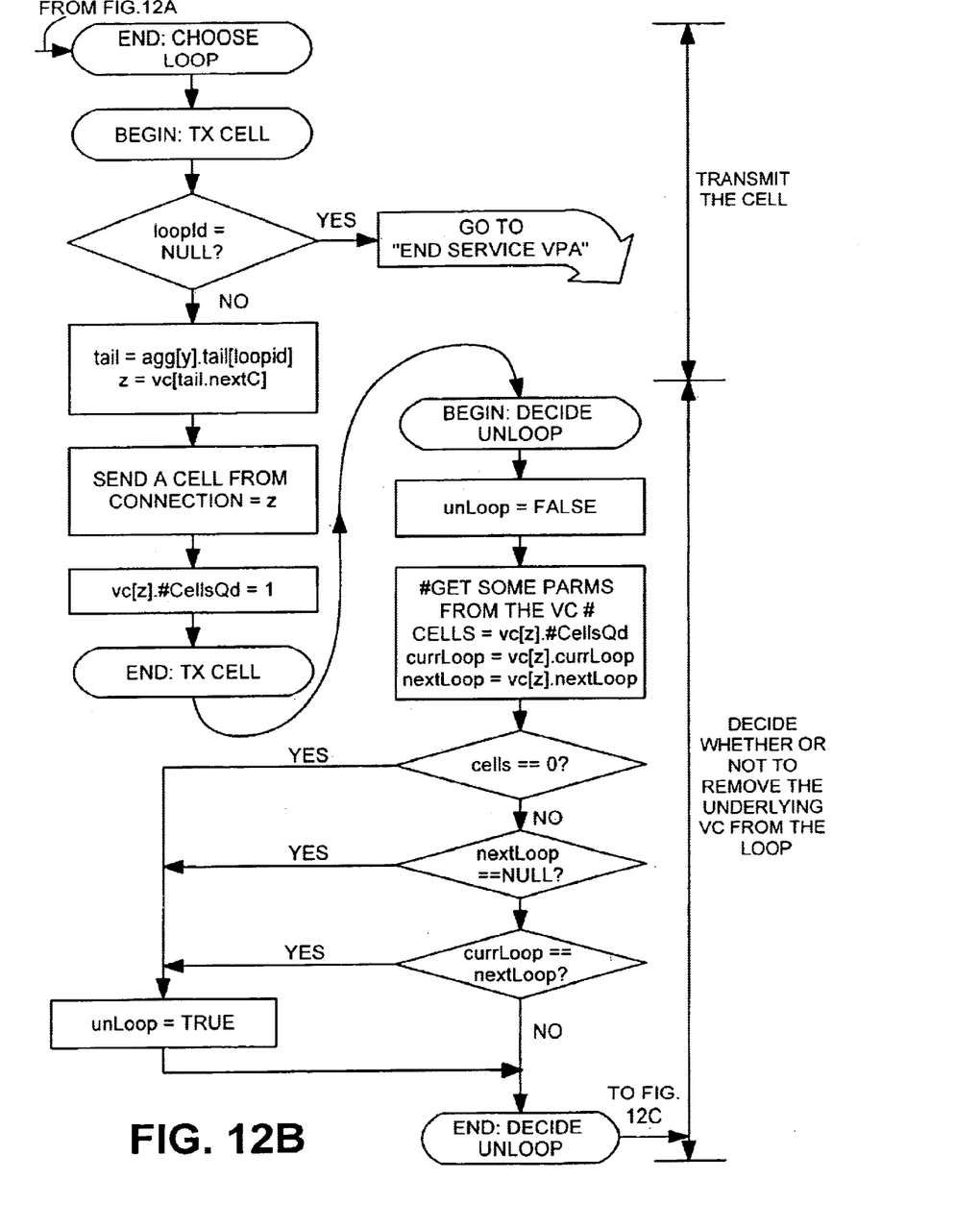
Figure 12C:
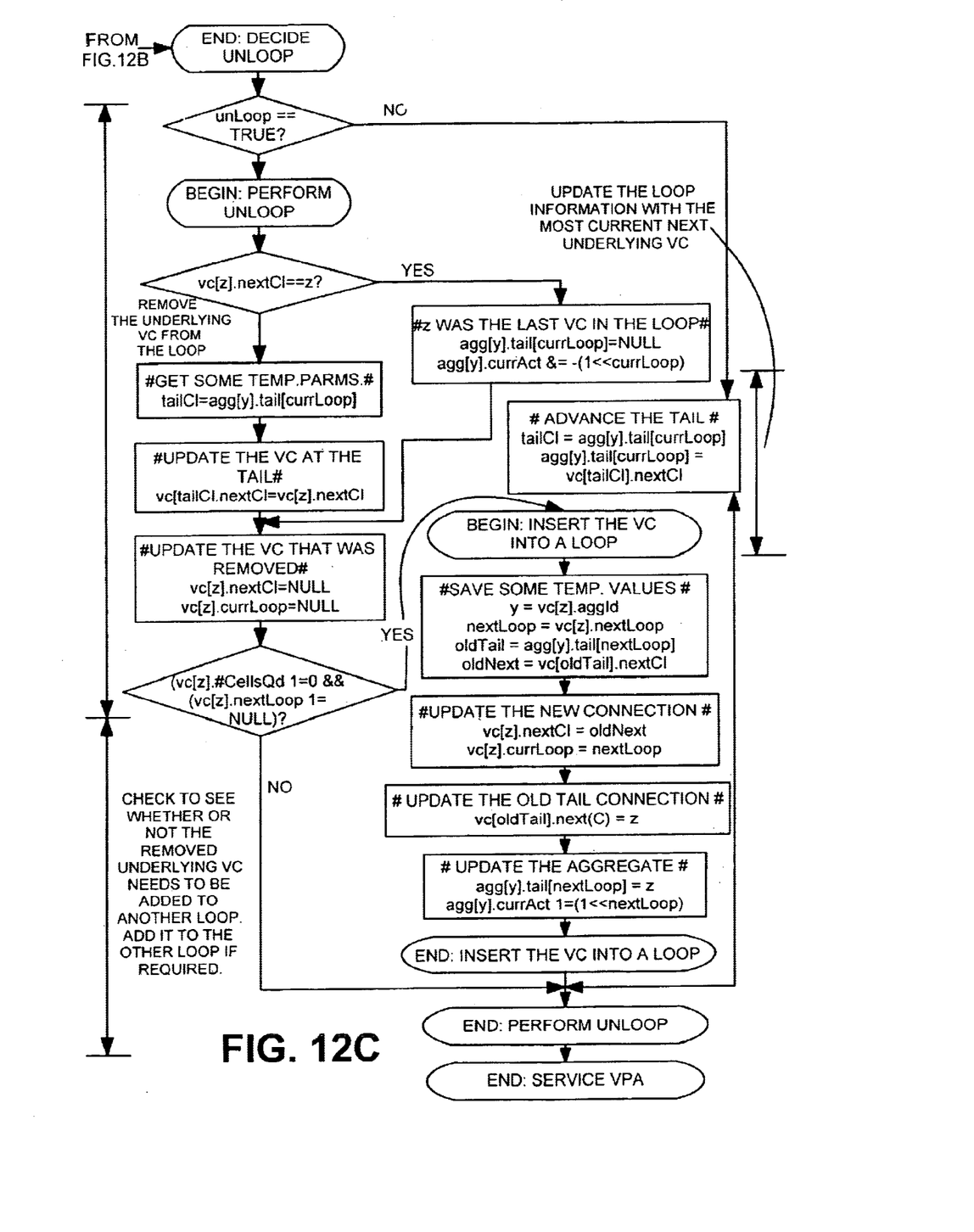

FIGS. 12A to 12C illustrate the algorithm for servicing a connection from a selected AVP. FIG. 12A sets out the process for choosing the loop within the selected aggregated-VP to be serviced. The upper portion of FIG. 12B relates to the transmission of a cell from the selected loop by examining the loop tail. The number of queued cells is decremented by one upon transmission of a cell. After a cell has been transmitted a decision is taken as to whether the connection is to be removed from the current loop as set out in the lower portion of FIG. 12B. Depending on this decision the connection is either removed from the loop or the loop information is updated as shown in the upper portion of FIG. 12C. Finally, if the connection is removed from its current loop a further decision is required to determine whether it should be added to a new loop.

While particular embodiments of the invention have been disclosed and illustrated, it will be apparent to one skilled in the art that variations and alternatives can be implemented without departing from the basic concept of the invention. It is to be understood that such variations and alternatives, to the extent possible, fall within the scope of the invention as defined by the appended claims.

What is claimed is:

1. In a communications system having a combination of: virtual circuit (VC) connections, virtual path (VP) connections, and aggregate virtual path (AVP) connections, said AVP connections having underlying VC and/or VP connections, said AVP connections represented as a circular linked list in which each one of said VC connections and VP connections is represented as an element of said circular link list based on a traffic descriptor, a method of arbitrating connection service comprising: selecting as between said VC connections, VP connections and AVP connections according to a first arbitration algorithm; and upon selection of one of said AVP connections choosing an underlying VC connection or VP connection within said AVP connection in accordance with a second arbitration algorithm which utilizes a weighted arbitration scheme to determine which of said circular linked lists to service.

2. The method as defined in claim 1 wherein a pointer in said circular linked list points to a last connection in said circular linked list to be serviced.

3. A method of arbitrating between underlying virtual circuits in an aggregate virtual path of a communications system comprising the steps of: assigning each underlying virtual circuit to one of a plurality of circular linked lists; each of said underlying virtual circuits representing an element in said circular linked list; and arbitrating between the linked lists in accordance with system traffic descriptors wherein said step of arbitrating is performed by an arbitration algorithm which analyzes a new virtual circuit connection in accordance with the traffic descriptors and determines whether said new virtual connection belongs to said one of said circular linked lists.

4. The method as defined in claim 3 wherein on determining that said connection belongs on said one of said circular linked lists, said arbitration algorithm chooses which of said circular linked lists it belongs and thereafter adds said connection to said chosen circular linked list.

5. The method as defined in claim 4 wherein said arbitration algorithm arbitrates as between said circular linked lists and chooses which of said circular linked lists to service and thereafter transmits a cell from said connection on said circular linked list.

6. The method as defined in claim 5 wherein upon transmission of said cell said arbitration algorithm determines whether said underlying virtual circuit should remain on said circular linked list.

7. The method as defined in claim 6 wherein if said arbitration algorithm determines that said underlying virtual circuit should not remain on its circular linked list said underlying virtual circuit is removed therefrom.

8. The method as defined in claim 7 wherein said arbitration algorithm determines whether said removed virtual circuit should be placed on another circular linked list and determines on which linked list it should be placed.

9. The method as defined in claim 6 wherein if said arbitration algorithm determine that said underlying virtual circuit should remain on said circular linked list, information respecting said linked list is revised.

10. The method as defined in claim 9 wherein reloadable weighting factors are implemented to arbitrate between linked lists.

11. The method as defined in claim 10 wherein a next element in said linked list is used to determine a next connection to service in a selected linked list.

12. The method as defined in claim 11 wherein real time service connections are given priority over non-real-time connections.

13. The method as defined in claim 12 wherein within a linked list having real time connections a round robin arbitration scheme is employed.

14. The method as define in claim 12 wherein within linked list having the non-real time connections a weighted round robin arbitration scheme is employed.

15. The method as define in claim 3 wherein a pointer in each of said circular linked lists point to a last virtual circuit to be serviced.

16. The method as define in claim 15 wherein said arbitration algorithm selects a next circular linked list to service.

* * * * *